United States Patent
Li et al.

(10) Patent No.: US 10,831,734 B2
(45) Date of Patent: Nov. 10, 2020

(54) UPDATE-INSERT FOR KEY-VALUE STORAGE INTERFACE

(71) Applicant: Intel Corporation, Santa Clara, CA (US)

(72) Inventors: Peng Li, Beaverton, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 15/973,428

(22) Filed: May 7, 2018

(65) Prior Publication Data

US 2019/0042571 A1   Feb. 7, 2019

(51) Int. Cl.
| G06F 16/00 | (2019.01) |
| G06F 16/22 | (2019.01) |
| G06F 16/25 | (2019.01) |
| G06F 16/23 | (2019.01) |

(52) U.S. Cl.
CPC ...... *G06F 16/2255* (2019.01); *G06F 16/2365* (2019.01); *G06F 16/2379* (2019.01); *G06F 16/258* (2019.01)

(58) Field of Classification Search
None
See application file for complete search history.

(56) References Cited

U.S. PATENT DOCUMENTS

| 2006/0130154 A1 | 6/2006 | Lam et al. |
| 2011/0219168 A1 | 9/2011 | Stephens |
| 2011/0276744 A1 | 11/2011 | Sengupta et al. |
| 2014/0059312 A1 | 2/2014 | Uno |
| 2014/0215170 A1 | 7/2014 | Scarpino et al. |
| 2015/0142733 A1* | 5/2015 | Shadmon ............... G06F 16/21 707/609 |
| 2015/0278208 A1 | 10/2015 | Foong et al. |

(Continued)

FOREIGN PATENT DOCUMENTS

WO   2016135578 A1   9/2016

OTHER PUBLICATIONS

Bender, M.A., et al., "Write Optimization in Storage Systems", (http://www.cs.stonybrook.edu/~rob/FAST17-tutorial.pdf), Training Session, 15th USENIX Conference on File and Storage Technologies (FAST 2017) Foils 156-182.

(Continued)

*Primary Examiner* — Bai D Vu
(74) *Attorney, Agent, or Firm* — Compass IP Law PC

(57) ABSTRACT

An update-insert ("upsert") interface manages updates to key-value storage at a memory or storage device. An upsert token is used to store a key and data for a transform to update a previous value stored for a key-value pair. The upsert token processing includes an upsert command to generate the upsert token for an existing key-value pair and store the upsert token in one or more first non-volatile memory (NVM) devices maintained at a memory or storage device. A hash-to-physical (H2P) table or index stored in one or more second NVM devices of the memory or storage device is utilized to locate and read the data for the key and the data for the transform and coalesce the transform(s) into a current value for the key-value pair, thereby avoiding unnecessary read and write amplification when updating key-value storage.

30 Claims, 12 Drawing Sheets

Scheme 200

(56) References Cited

U.S. PATENT DOCUMENTS

| | | |
|---|---|---|
| 2016/0099810 A1 | 4/2016 | Li et al. |
| 2017/0185293 A1 | 6/2017 | Malikowski et al. |
| 2017/0357462 A1 | 12/2017 | Walker et al. |
| 2018/0089074 A1 | 3/2018 | Li et al. |
| 2019/0310974 A1* | 10/2019 | Pishe .................. G06F 16/2255 |

OTHER PUBLICATIONS

International Search Report and Written Opinion for PCT Patent Application No. PCT/US2017/047911, dated Nov. 28, 2017, 12 pages.

\* cited by examiner

UPDATE-INSERT FOR KEY-VALUE STORAGE INTERFACE

TECHNICAL FIELD

Examples described herein are generally related to use of key-value storage techniques to store data at a memory or storage device.

BACKGROUND

Conventional key-value/object-storage systems such as databases or file-systems may be implemented via use of multiple layers of software between a top application layer and a bottom memory or storage device layer (e.g., solid state drive or hard disk drive). These multiple layers may include indirection systems, portable operating system interfaces (POSIXs), file systems, volume managers or memory/storage device drivers. One of the most computing-intensive layers of software is the mapping from the key-value interface to the logical block addresses of the memory/storage device.

DETAILED DESCRIPTION

Figure 1:
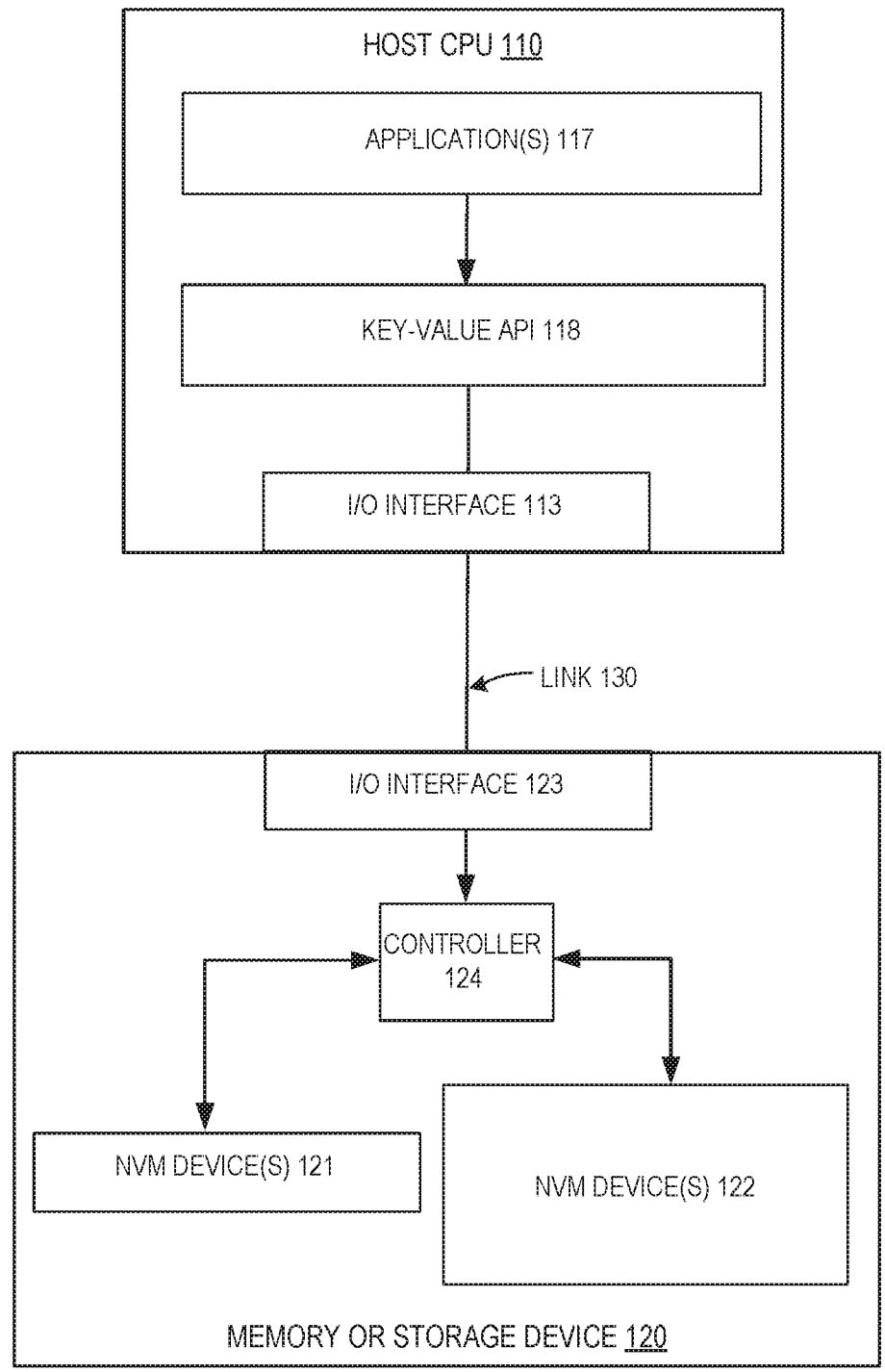
FIG. 1 illustrates an example system.

Multiple layers of software between a top application layer and a bottom memory or storage device layer for conventional key-value/object-storage systems may cause an increase in latencies to read/write data to memory or storage devices. The multiple layers may also cause increased central processor unit (CPU) utilization for processing elements at a host computing platform coupled with memory or storage devices. Both the increase in latencies and increase in host CPU utilization may lead to scaling issues as data requirements continue to grow.

According to some examples, in systems utilizing logical block addressing (LBA), one of the layers having a large impact on latencies and host CPU utilization is a layer associated with mapping from a key-value (KV) interface to LBAs. Conventional mapping from a KV interface to LBAs typically employs multi-level sorted trees and host-side garbage collection and merges (e.g., log-structured merge (LSM) trees) on most types of data access workloads. In some examples, this type of conventional mapping from a KV interface to LBAs may introduce as much as a 10× write amplification.

Recent advances in storage systems include providing a KV interface directly in the storage device. For example, compared to employing an LSM tree on the host, a direct KV interface can be employed in a solid-state storage device (SSD) using a fast, non-volatile memory for Key-to-Physical mapping as opposed to LBA-to-physical mapping. An example of a direct KV interface is described in commonly assigned U.S. patent application Ser. No. 15/279,279, using, among other techniques, hash tables and logical band schemes for implementing a KV interface directly in an SSD.

Even with the efficiencies provided by direct KV interface mapping, performance can still be an issue. For example, for several KV data storage applications, the value in each KV pair is simply a count (e.g., a reference count) for the associated key. To update the value of a KV pair, conventional methods will need to read the current value of the KV pair, update the value and re-write it.

The read-update-rewrite operations generate additional read amplification for update operations and slow down the update-operations by requiring real-time random reads. For example, on a NAND SSD which has fast queue-depth (QD1) write-latency (sub-10 us) and longer read-latency (~100 us), the update operation takes ~110 us to complete. While the direct KV-interface offers lesser write-amplification, it too suffers from a get-modify-put penalty for update operations.

To address the problem of read amplification for update operations, techniques for "upsert" operations (update-insert) have been developed for conventional KV interface mapping, such as those implemented in deployments that use tree-based KV structures for LSM trees. The "upsert" operation places an upsert token in the tree branch before the leaf that contains the key. The token is processed in the background during a 'defrag' like operation to restore the read/get performance which is temporarily impacted due to the need to read both the token and original value. While the "upsert" operation can reduce the update-latencies to 10-20 us in the NAND SSD example listed above, the tree-based schemes for KV interface mapping suffer from very high large host-side write amplification (>=10×), and can be similarly inefficient when run on SSD non-volatile memory (NVM) media as well.

In the description that follows, embodiments of a KV upsert command employ the hash table and logical band schemes of a direct KV interface to increase the performance of updating the KV pair using techniques for update-insert ("upsert") operations. In one embodiment, rather than a get-modify-put operation, embodiments of an upsert operation define a new KV upsert command as part of the direct KV API, the KV API facilitating inserting a new type of entry record in the NVM device defined as an upsert token. In one embodiment, the upsert token is inserted in a new location in the currently open logical-band responsive to the KV upsert command, with a pointer in the upsert token pointing to the original location of the KV pair to which it pertains (which could be in another logical-band). In one embodiment, a get command of the direct KV API supports upsert tokens created by the KV upsert command, including performing value coalescing in which the upsert tokens are applied to the value of the KV pair in order from most recently inserted upsert token to first inserted upsert token. In one embodiment, the defragmentation and power-loss-recovery operations support multiple upsert tokens and value coalescing to achieve greater efficiency in the use of NVM for KV storage. While the description that follows discusses embodiments of a KV API to support upsert commands, upsert tokens and upsert operations for KV pairs in the context of count-updates, i.e. where the value of the KV pair is incremented or decremented, the KV API support for KV upsert commands and related upsert operations may be used in other contexts as well, such as string updates, float-value updates, etc.

FIG. 1 illustrates an example system 100. In some examples, as shown in FIG. 1, system 100 includes a host CPU 110 coupled to a memory or storage device 120 through input/output (I/O) interface 113 and I/O interface 123. Also, as shown in FIG. 1, host CPU 110 may be arranged to execute one or more application(s) 117 and have a key-value application programming interface (KV API) 118. In some examples, as described more below, KV API 118 may be arranged to enable elements of host CPU 110 to generate key-value commands that may be routed through I/O interface 113 and over a link 130 to memory or storage device 120. For these examples, memory or storage device 120 may serve as an object device for a key-value/object-storage system.

Responsive to received KV commands (e.g., get, put, delete or scan) logic and/or features at memory or storage device 120 such as a controller 124 may be capable of providing a key-to-physical mapping at non-volatile memory (NVM) device(s) 121 via use of a hash table or index and use this key-to-physical mapping to locate physical locations in NVM device(s) 122 arranged to store flexible sized key-value entries. Responsive to received KV commands for update-insert (the KV upsert command) logic and/or features at memory or storage device 120 such as a controller 124 may be further capable of providing a key-to-physical mapping at non-volatile memory (NVM) device(s) 121 via use of a hash table or index and use this key-to-physical mapping to locate physical locations in NVM device(s) 122 arranged to store flexible sized key-value entries, including upsert tokens, and carry out an upsert KV command in conjunction with other KV commands (e.g., get, put, delete or scan) while minimizing the impact of updating KV pairs stored in NVM device(s) 121. Also, as described more below, defragmentation operations and power-loss-recovery operations may be implemented by logic and/or features at memory or storage device 120 such as controller 124 that support upsert KV commands in a manner that has little to no write amplification compared to host-side garbage-collection and merges such as LSM trees.

According to some examples, I/O interface 113, I/O interface 123 and link 130 may be arranged to operate according to one or more communication protocols and/or memory or storage access technologies. For examples, I/O interface 113, link 130 and I/O interface 123 may be arranged to use communication protocols according to the Peripheral Component Interconnect (PCI) Express Base Specification, revision 3.1a, published in December 2015 ("PCI Express specification" or "PCIe specification") or according to one or more Ethernet standards promulgated by the Institute of Electrical and Electronics Engineers (IEEE) such as but not limited to IEEE 802.3-2012, Carrier sense Multiple access with Collision Detection (CSMA/CD) Access Method and Physical Layer Specifications, Published in December 2012 (hereinafter "IEEE 802.3 specification"). I/O interface 113, link 130 and I/O interface 123 may also be arranged to use memory or storage access technologies to include, but not limited to, the Non-Volatile Memory Express (NVMe) Specification, revision 1.2a, published in October 2015 ("NVMe specification") or the Serial Attached SCSI (SAS) Specification, revision 3.0, published in November 2013 ("SAS-3 specification"). Also protocol extensions such as, but not limited to, NVMe over Fibre Channel ("NVMf"), the simple storage service ("S3"), Swift or Kinetic protocol extensions may be used to relay key-value commands from elements of host CPU 210 to elements of memory or storage device 120. In some examples, memory or storage device 120 may include, but is not limited to, a solid state drive or dual in-line memory module.

In some examples, host CPU 110 may be part of a host computing platform that may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

In some examples, host CPU 110 may include various commercially available processors, including without limitation an AMD® Athlon®, Duron® and Opteron® processors; NVIDIA® Tegra® processors, ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors.

According to some examples, NVM device(s) 121 and/or NVM device(s) 122 at memory or storage device 120 may be composed of one or more memory devices or dies which may include various types of non-volatile memory. The various types of non-volatile memory may include, but are not limited to, non-volatile types of memory such as 3-dimensional (3-D) cross-point memory that may be byte or block addressable. These byte or block addressable non-volatile types of memory may include, but are not limited to, memory that uses 3-D cross-point memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), silicon-oxide-nitride-oxide-silicon (SONOS) memory, magnetoresistive random access memory (MRAM) memory that incorporates memristor technology, or spin transfer torque MRAM (STT-MRAM), or a combination of any of the above, or other non-volatile memory types.

Figure 2:
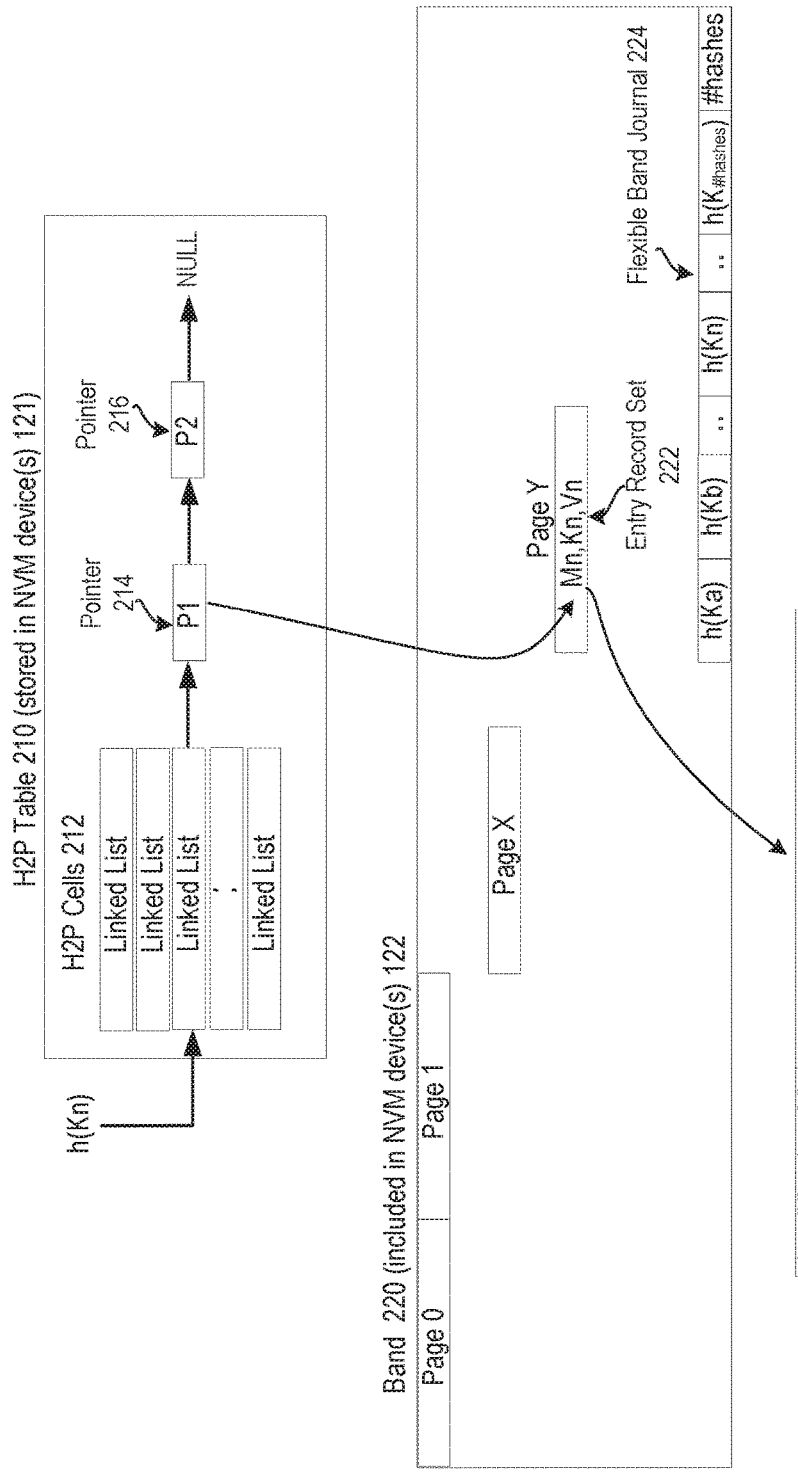
FIG. 2 illustrates an example scheme.

FIG. 2 illustrates example scheme 200. In some examples, as shown in FIG. 2, scheme 200 may illustrate an example of how key-to-physical mapping included in a hash-to-physical (H2P) table 210 may be used to locate address ranges in a band 220, also referred to herein as a logical band 220. The address ranges include physical address ranges and logical address ranges. For these examples, as shown in FIG. 2, H2P table 210 may be stored at NVM device(s) 121 and band 220 may be stored at NVM device(s) 122. In some examples, a given band such as band 220 may encompass or comprise multiple memory devices or dies included in NVM device(s) 122.

According to some examples, H2P table 210 may map user keys (K) to physical media address ranges (P). Although this disclosure is not limited to NAND types of non-volatile memory or media, P for NAND media may specify a band identifier, a memory page identifier and a byte-length of a key-value entry record that corresponds to K values stored on the NAND media. For example, P1 of pointer 214 may specify band 220, page Y and a byte-length of entry record set 222. In some examples, NVM device(s) 121 may be a type of non-volatile memory having relatively faster read/write access times compared to a type of NVM that includes NAND such as, but not limited to, 3-D cross-point memory that may include phase change memory that uses chalcogenide phase change material. For these examples, the 3-D cross-point memory for NVM device(s) 121 may be byte addressable.

In some examples, logic and/or features at storage or memory device 120 such as controller 124 may use any hash function "h", and collision handling scheme to implement H2P table 210. For example, a linked-list per H2P cell 212 may be used for collision handling when using a hash function to generate hash values h($K_0$) that results in selection of P1 for pointer 214 over P2 for pointer 216 as shown in FIG. 2.

According to some examples, each band maintained at NVM device(s) 122 may be arranged to contain one or more entry record sets such as entry record set 222 that include (Meta, Key, Value) fields. For example, Meta field "$M_0$" included in entry record set 222 may be a fixed length field containing lengths of corresponding key field "$K_0$" and value field "$V_0$" and optionally may also contain other field-length meta data such as, but not limited to, a cyclic redundancy check (CRC) data or compression information. Key field "$K_0$" and/or value field "$V_0$" may be of variable or flexible lengths.

In some examples, a flexible band journal 224 may be maintained at band 220 as shown in FIG. 2. For these examples, flexible band journal 224 may contain hashes or hash values of keys that map to entry record sets stored to band 220. For example, flexible band journal 224 includes hash h(Key=$K_0$) that maps to entry record set 222 as shown in FIG. 2. Flexible band journal 224 may be deemed as flexible or variable due to the variable or flexible lengths allowed for in the key and/or value fields as mentioned above for entry record set 222. Depending on the lengths of the key and/or value fields of each entry record set stored to band 220, the number of hashes included in flexible band journal 224 may vary. For example, longer lengths of the key and/or value fields may fill up a storage capacity of a band 220 such that fewer hashes to map to these longer length entry record sets are needed compared to shorter length entry record sets.

According to some examples, flexible band journal 224 may be utilized with a defragmentation code or algorithm implemented by logic and/or features at memory or storage device 120 to allow for efficient defragmentation operations and power-loss-recovery operations. For these examples, hashes such as h(K#hashes) and information such as #hashes included in flexible band journal 224 may be used to facilitate efficient defragmentation and power-loss-recovery operations.

Figure 3A:
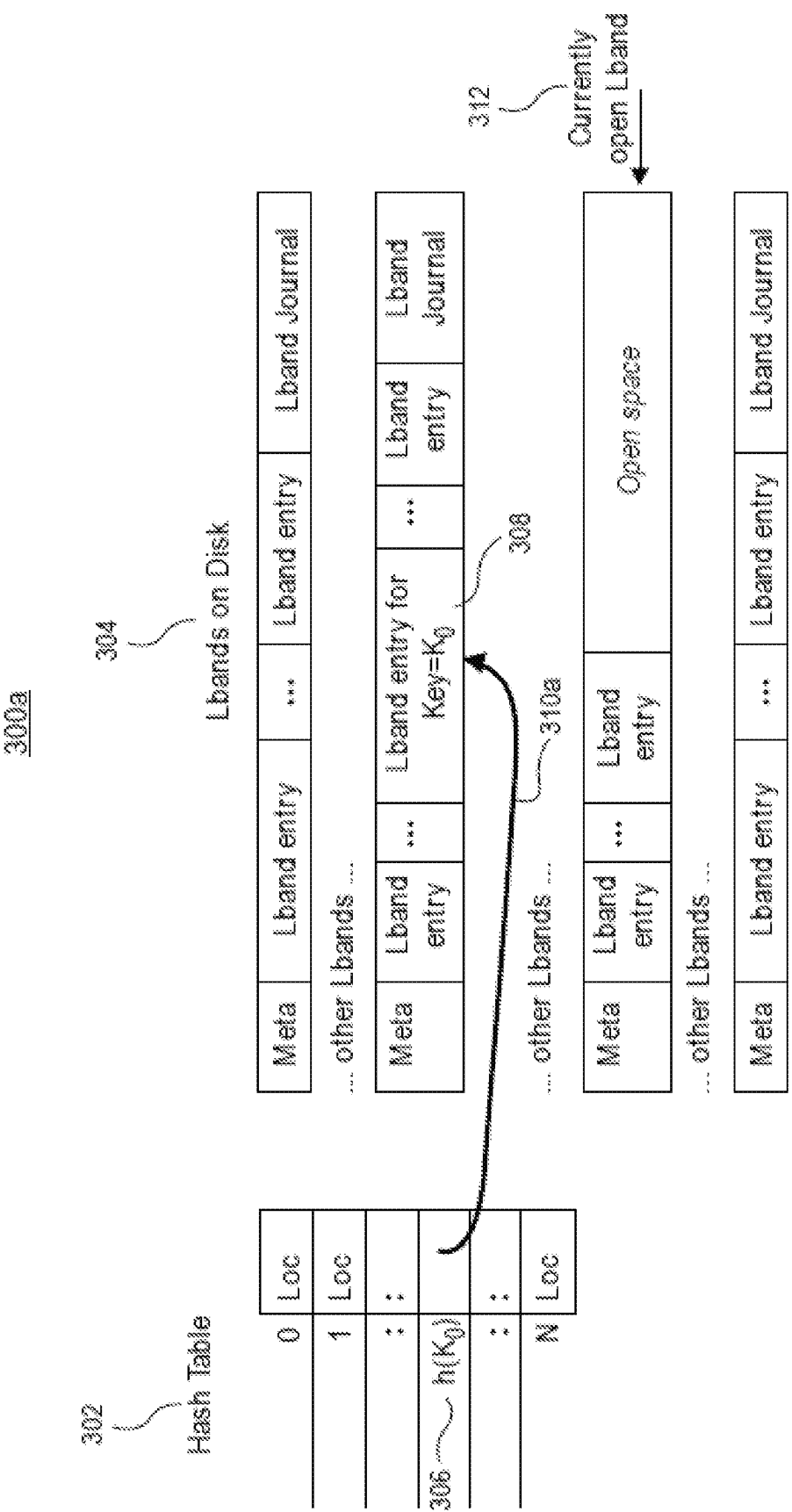
FIGS. 3A-3B illustrate an example scheme in further detail.
Figure 3B:
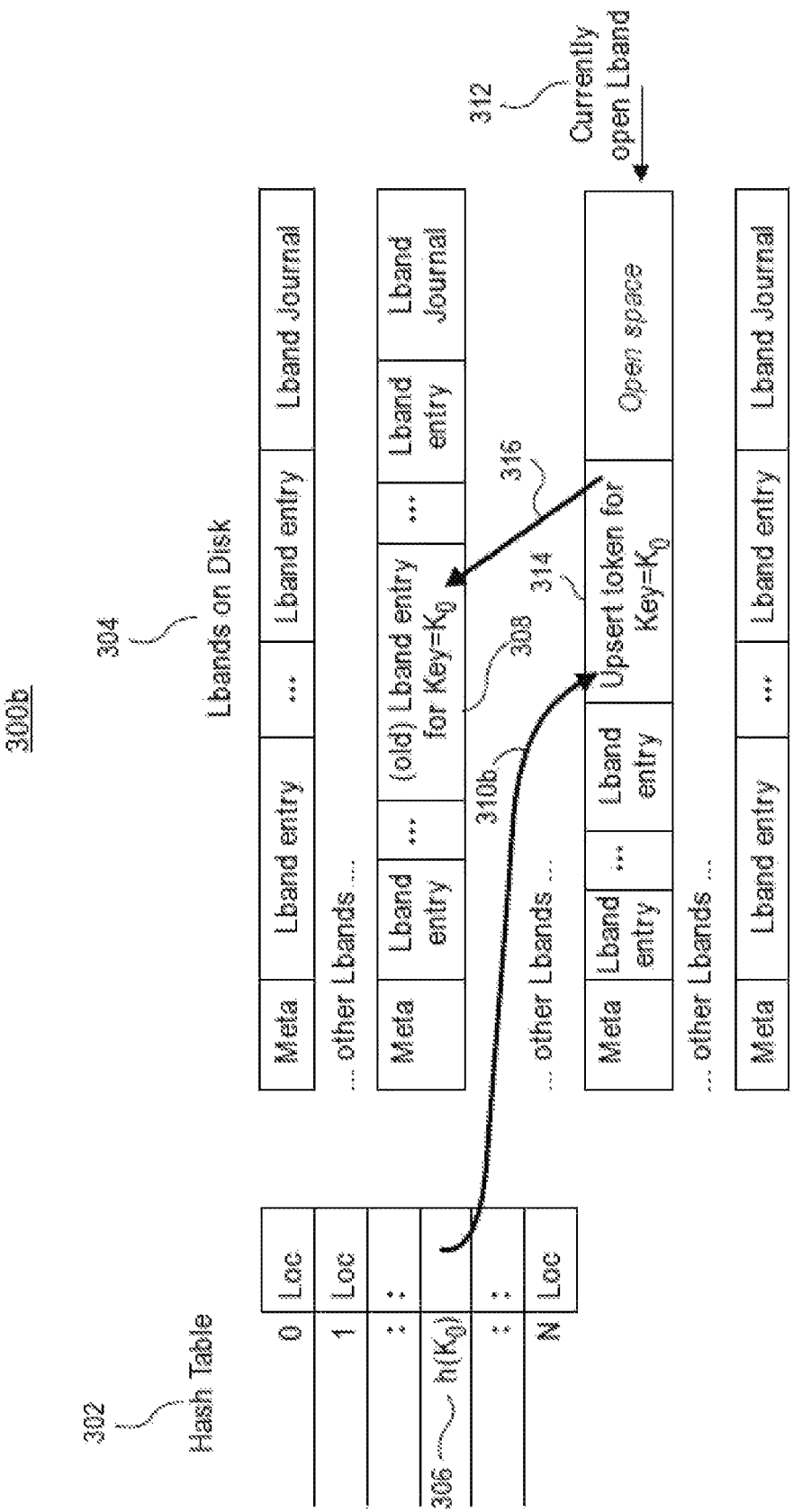

FIGS. 3A-3B illustrates an example scheme 300, 350 for use with an API facilitating update-insert, or upsert operations. As shown in FIG. 3A, scheme 300 includes an example hash table 302 having numerous entries 0 . . . N, where the entries represent the hash value of a key, e.g. $K_0$, and a corresponding pointer, Loc, that points 310a to a location 308 in the Lbands on Disc 304, where location 308 represents a logical or physical address range where the entry record for Key=$K_0$ is stored. Other Lbands fill up the physical address space of the disk and may include an open space 312 that represents the currently open Lband into which new entry records may be stored, where the entry records can include new KV pairs containing a key and a value, or new upsert tokens referencing an existing KV pair, the upsert tokens containing, among other data, data for the key and data for a transform that can be applied to the value of the KV pair to which it pertains as described in further detail in the description that follows.

In the current example illustrated in FIG. 3A, the location 308 stores a KV pair entry record for Key=$K_0$ before any update has been requested using the API interface for upsert processing. FIG. 3B illustrates the same scheme 300b after update-insert processing has occurred. As shown, after an upsert processing, instead of updating the KV pair stored at location 308, the hash table entry for Key=$K_0$ is updated to point 310b to a new location in the open space of the currently open Lband 312 where an upsert token 314 for Key=$K_0$ has been stored. As shown, the upsert token 314 references the original location 308 where the KV pair entry record remains stored after the upsert operation. During subsequent upsert token processing, such as a request to get the KV pair from storage, the transform contained in the upsert token is applied to the non-updated, or previous, value in the KV pair, so that a get command returns the current value of the KV pair, i.e. the previous value updated with the transform. This process is repeated for as many upsert tokens as are stored for a given KV pair, until all the upsert tokens are merged into an updated KV pair containing the current value, such as during defragmentation of the Lbands on Disk 304, as will be described in further detail below.

Figure 4:
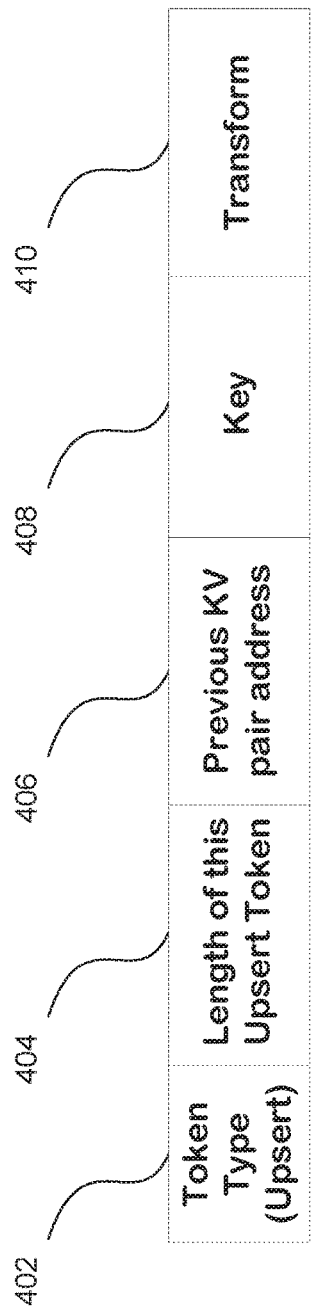
FIG. 4 illustrates an example scheme in further detail.
Figure 5:
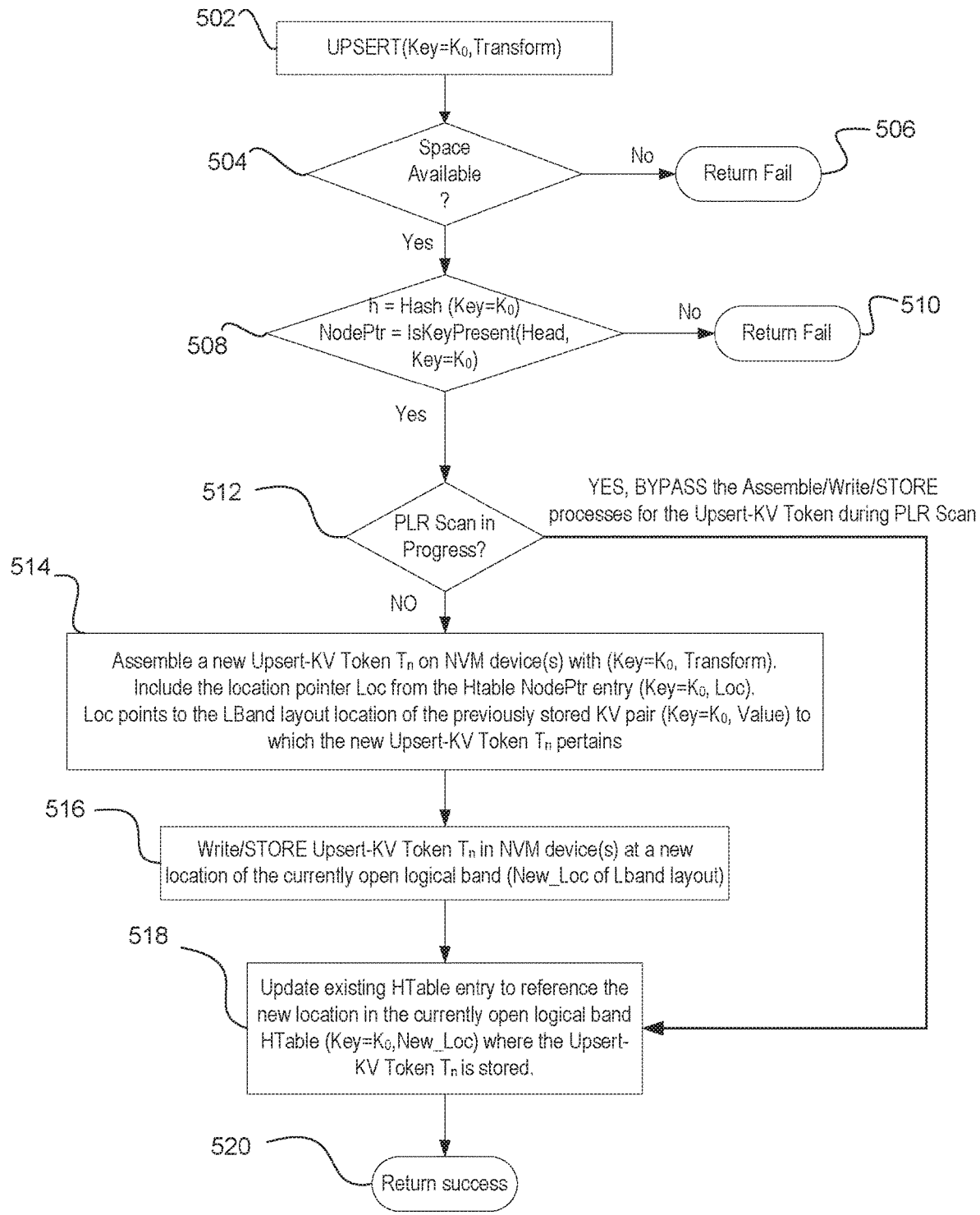
FIG. 5 illustrates an example first logic flow.

FIG. 4 illustrates example scheme 400. As shown, the scheme 400 is an example upsert token layout, including a token type, i.e. "Upsert" and the length 404 of the upsert token. The example upsert token 400 also includes a reference to the previous KV pair address, e.g. the location 308 pointed to by pointer Loc 310a of hash table entry 306 of hash table 302 as illustrated in the example described in FIG. 3A. The example upsert token 400 also includes the Key 408 and the data for the Transform 410 to be applied to the value of the corresponding KV pair referenced in the token. The Transform 410 can include any one of a delta, function, counter, or the like that, when applied to a value, transforms the value into a new/updated value.

FIGS. 5-8 illustrate example logic flows 500-800. A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

In the examples that follow, logic flows 500-800 may be representative of some or all the operations executed by one or more logic, features, or devices described herein, such as apparatus 900 illustrated in detail with reference to FIG. 9. More particularly, logic flows 500-800 may be implemented in software, firmware, and/or hardware in receive logic 922-1, store logic 922-2, pointer logic 922-3, journal logic 922-4, read logic 922-5, send logic 922-6, relocate logic 922-7, or erase logic 922-8, all of which are described in further detail with reference to FIG. 9.

FIG. 500 illustrates an example update-insert process 500 logic flow. In some examples, logic flow 500 may be for handling a type of key-value command received from elements of a host CPU such as host CPU 110 shown in FIG. 1. The type of key-value command is an update key-value command to cause a Key and Value stored as an entry record set at a memory or storage device to be updated using an update-insert technique. For these examples, elements of memory or storage device 120 such as I/O interface 123, controller 124, NVM device(s) 121 or NVM device(s) 122 as shown in FIG. 1 may be related to logic flow 500. Also, aspects of scheme 200, scheme 300a/300b and scheme 400 as shown in FIGS. 2, 3A-3B and 4 may be related to logic flow 500. However, example logic flow 500 is not limited to implementations using elements, schemes or codes as shown in FIGS. 1, 2, 3A-3B and 4.

Beginning at block 502, an element of host CPU 110 such as application(s) 117 may utilize KV API 118 to generate an upsert key-value command UPSERT (Key, Transform) and cause the UPSERT (Key, Transform) command to be routed through I/O interface 113 and over link 130 to be received by memory or storage device 120 through I/O interface 123. In some examples, Key may include data for a key and Transform may include data for updating the value of a KV pair, the Transform to be stored along with the Key in an entry record as an upsert token in one or more NVM devices maintained at memory or storage device 120 such as NVM device(s) 122. For these examples, the UPSERT (Key, Transform) command may be received by logic and/or features of controller 124.

At decision block 504, logic and/or features of controller 124 may determine whether space is available in NVM device(s) 122 to store data for Key and data for Transform in an entry record as an upsert token, as well as space to maintain a flexible band journal. In some examples, NVM device(s) 122 may include non-volatile types of memory such as NAND memory. For these examples, the logic and/or features of controller 124 may determine whether one or more NAND bands that may include NAND band 220 have enough space.

At termination block 506, logic and/or features of controller 124 determined that space is not available. In some examples, logic and/or features of controller 124 may return a fail indication to indicate that the put key-value command has failed.

At decision block 508, logic and/or features of controller 124 proceeds to determine whether the Key=$K_0$ is present. According to some examples, logic and/or features of controller 124 may generate a hash or hash value "h" based on Key=$K_0$ and then implement a function to determine if Key has previously been stored to NVM device(s) 122 using, e.g., an IsKeyPresent (H2P[h], Key=$K_0$) algorithm. Since space is determined to be available, the logic and/or features of controller 124 may allocate a range of physical memory addresses P at NVM device(s) 122 for an entry record set that includes one or more upsert tokens $T_n$, such as described in the example token 400, in a currently open band. In some examples, if the currently open band cannot fit the entry record set and a flexible band journal, then the logic and/or features of controller 124 may close the open band by writing or completing the flexible band journal and then allocate the range of physical memory addresses P in a next blank band included in NVM device(s) 122.

At termination block 510, logic and/or features of controller 124 determined that the key is not present. In some examples, logic and/or features of controller 124 may return a fail indication to indicate that the put key-value command has failed.

At decision block 512, logic and/or features of controller 124 may determine whether the update-insert process 500 is being performed in the context of a power-loss-recovery (PLR) scan as will be described in further detail below. If so, then the logic flow 500 bypasses the next processes for assembling, writing and storing the upsert token $T_n$ at blocks 514/516, and instead simply updates the HTable entry at block 518.

At block 514, logic and/or features of controller 124 may assemble the entry record set into an upsert token $T_n$, where "n" represents however many Tokens $T_1, T_2, \ldots T_n$ for a given Key=$k_0$ are assembled and the upsert token's order of insertion relative to other upsert tokens. In one embodiment upsert token $T_n$ is assembled according to the scheme illustrated in example upsert token 400, including the data for the Key, Transform, and a location Address (Loc) of the existing KV pair to which the upsert token $T_n$ pertains.

At block 516, logic and/or features of controller 124 may write/store the entry record set of the upsert token $T_n$, which entry record set is written to a NAND band included in NVM device(s) 122 at new location Loc in the currently open logical band, LBand, e.g. in the range of physical memory addresses P.

At block 518, logic and/or features of controller 124 may update the existing hash table entry to reference the new location in the currently open logical band where the upsert token $T_n$ is stored, e.g. HTable (Key=$K_0$, New_Loc). In some examples, logic and/or features of controller 124 may add the new pointer, New_Loc, to a linked list associated with an H2P table stored in one or more NVM devices separate from NVM device(s) 122. For these examples, the one or more NVM devices may be maintained in NVM device(s) 121 and the H2P table may be H2P table 210, an example of which is illustrated in FIGS. 3A-3B at 302. H2P[h] may result from use of Key in a hash function to generate hash value "h". H2P cells 212 may be used to select the pointer, e.g., New_Loc, based on hash value "h" to locate where in NVM device(s) 122 the entry record for the upsert token containing the Key and Transform for a KV pair has been stored. At block 518, logic and/or features of controller 124 may also add hash value "h" to a flexible band journal maintained in NVM device(s) 122 for the currently open band.

At block 520, logic and/or features of controller 124 may return a success indication to indicate that the UPSERT KV command has been successfully implemented and data for both the Key, Transform, and the previous location address (Loc) of the KV pair to which the upsert token pertains has been stored to memory or storage device 120.

In some examples, data for Keys and/or data for the update Transform(s) may be stored to NVM device(s) 122 in a compressed state. For these examples, the data for Keys and/or data for Transform(s) may be compressed with a codec as they are stored to NVM device(s) 122 and decompressed when read from NVM device(s) 122. The lengths stored in Meta fields of respective entry records may indicate compressed lengths.

According to some examples, logic and/or features of controller 124 may impose granularity and size restrictions on data for Keys and/or data for Transforms, thereby reducing an amount of space needed for entry records stored to NVM device(s) 122. For example, entry records may be limited to support only fixed size (e.g., exactly 8 byte) Keys. In this case, the key-length need not be stored in entry records.

In some examples, memory or storage device 120 may be arranged to support only small (e.g., up to 8 byte) Keys. For these examples, Keys and key-lengths may be stored in NVM device(s) 121 rather than at NVM device(s) 122 with the upsert token entry records stored at NVM device(s) 122 holding data for respective Values and/or address location (Loc) of the KV pair to which the upsert token pertains.

According to some examples, rather than storing a key-length in a Meta field at NVM device(s) 122, data for the Key and data for the Transform and the data for the reference to the location of the KV pair, e.g., Loc, may be separated by a special character, e.g., '/0'. This separation by the special character may provide additional compaction for cases where Keys may be known to be character-strings rather than byte-strings.

Figure 6:
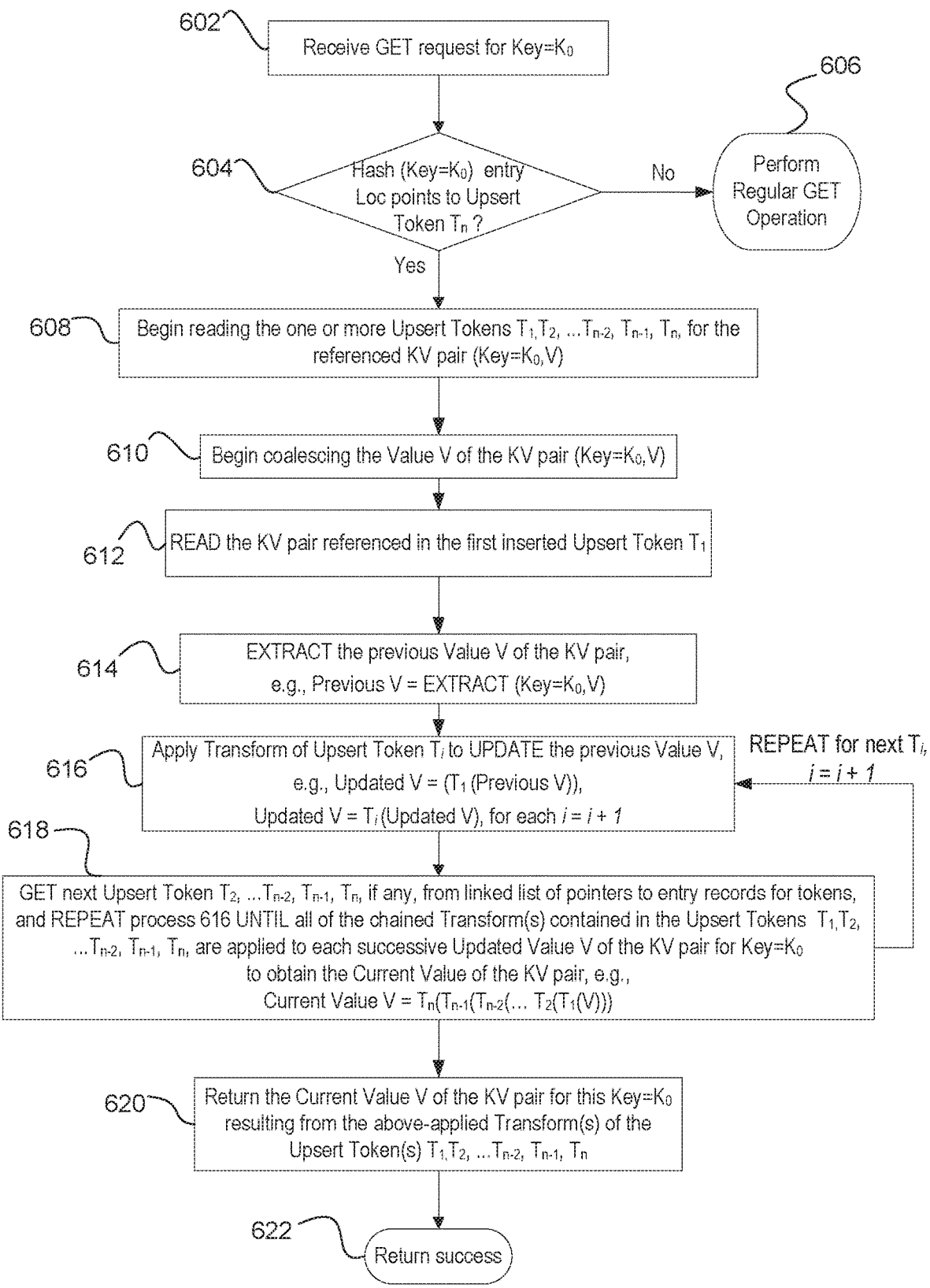
FIG. 6 illustrates an example second logic flow.

FIG. 6 illustrates an example logic flow 600. In some examples, logic flow 600 may be for handling a type of key-value command received from elements of a host CPU such as host CPU 110 shown in FIG. 1. The type of key-value command may be a get key-value command to obtain a Key and read an entry record set stored to a memory or storage device. For these examples, elements of memory or storage device 120 such as I/O interface 123, controller 124, NVM device(s) 121 or NVM device(s) 122 as shown in FIG. 1 may be related to logic flow 600. Also, aspects of schemes 200, 300a-300b, 400, or logic flow 500 as shown in FIGS. 2-5 may be related to logic flow 600. However, example logic flow 600 is not limited to implementations using elements, schemes or logic flows as shown in FIGS. 1-5.

Beginning at block 602, an element of host CPU 110 such as application(s) 117 may utilize key-value API 118 to generate a get key-value command, e.g., GET(Key), and cause the get key-value command to be routed through I/O interface 113 and over link 130 to be received by memory or storage device 120 through I/O interface 123. In some examples, Key may include data for retrieving a value stored in one or more NVM devices maintained at memory or storage device 120 such as NVM device(s) 122. For these examples, the get key-value command may be received by logic and/or features of controller 124.

At decision block 604, logic and/or features of controller 124 may determine whether the Key has previously been stored to NVM device(s) 122, such as by generating a hash or hash value "h" based on Key=$K_0$ and then using the hash table 302 (FIGS. 3A-3B) to determine whether an entry exists for the hash value "h." If the entry does exist, and the process 600 determines that the entry contains a location, Loc, that points to an upsert token entry record 314 (FIG. 3B), as opposed to pointing to an actual KV pair entry record 308 (FIGS. 3A-3B), then the upsert token support process 600 for get commands is commenced at block 608; otherwise a regular get operation is performed at termination block 606.

At block 608, logic and/or features of controller 124 reads the upsert token $T_n$. This token is the last (most recently) inserted upsert token stored for Key=$K_0$, e.g., the last token in a chain of upsert tokens $T_n$, $T_{n-1}$, ... $T_1$, related to the KV pair (Key=$K_0$, V) referenced in the first upsert token $T_1$. At block 610, logic and/or features of controller 124 begins coalescing the value V of the KV pair (Key=$K_0$, V).

At block 610, logic and/or features of controller 124 begins the upsert token support processes for coalescing of the value V for the KV pair, starting at block 612 with reading the KV pair referenced in the first upsert token T1, i.e., the first inserted token in the chain of upsert tokens $T_n$, $T_{n-1}$, ... $T_1$, related to the KV pair (Key=$K_0$, V).

At block 614, logic and/or features of controller 124 continues the upsert token support processes for coalescing of the value V for the KV pair, extracting the previous value V of the KV pair read at block 610, e.g., Previous $V$=EXTRACT($K$=$K_0$,$V$).

At block 616, logic and/or features of controller 124 continues the upsert token support processes for coalescing of the value V for the KV pair by applying the Transform of a first upsert token $T_1$ to update the previous Value V of the KV pair, e.g., Updated $V$=$T_1$(Previous $V$)

At block 618, logic and/or features of controller 124 continues the upsert token support processes for coalescing of the value V for the KV pair. For example, for chained upsert tokens $T_1$, ..., $T_{n-2}$, $T_{n-1}$, $T_n$, for a given KV pair (Key=$K_0$, V), where $T_1$ is the first inserted token and $T_n$ is the most recently inserted token pertaining to the KV pair, the controller 124 repeats block 616 to apply the Transforms of the chained upsert tokens in order. For example, block 616 is repeated for application of the Transform of the next upsert token $T_i$, for each increment of i=i+1, to further update the updated value V of the KV pair, e.g., Updated $V$=$T_i$(Updated $V$), for each $i$=$i$+1

In one embodiment, logic and/or features of controller 124 obtains the next upsert token, e.g., $T_2$, ..., $T_{n-2}$, $T_{n-1}$, $T_n$, from a linked list of pointers to entry records that contain the chain of upsert tokens $T_1$, $T_2$, ..., $T_{n-2}$, $T_{n-1}$, $T_n$, related to the KV pair (Key=$K_0$, V). For example, the pointer to the address of the next upsert token can be obtained from the pointer (Loc) contained in the previous token. Block 616 is repeated until all the Transform(s) contained in the chain of upsert tokens have been applied, in order, to each successive updated value V for the KV pair such that the most recently inserted token is applied last, e.g.:

Current Value $V$=$T_n$($T_{n-1}$($T_{n-2}$( ... $T_2$($T_1$($V$)))

At block 620, logic and/or features of controller 124 return the current Value of the KV pair for this Key=$K_0$, and at block 618, may return a success indication to indicate that the get key-value command for a KV pair with upsert token support has been successfully implemented.

Figure 7:
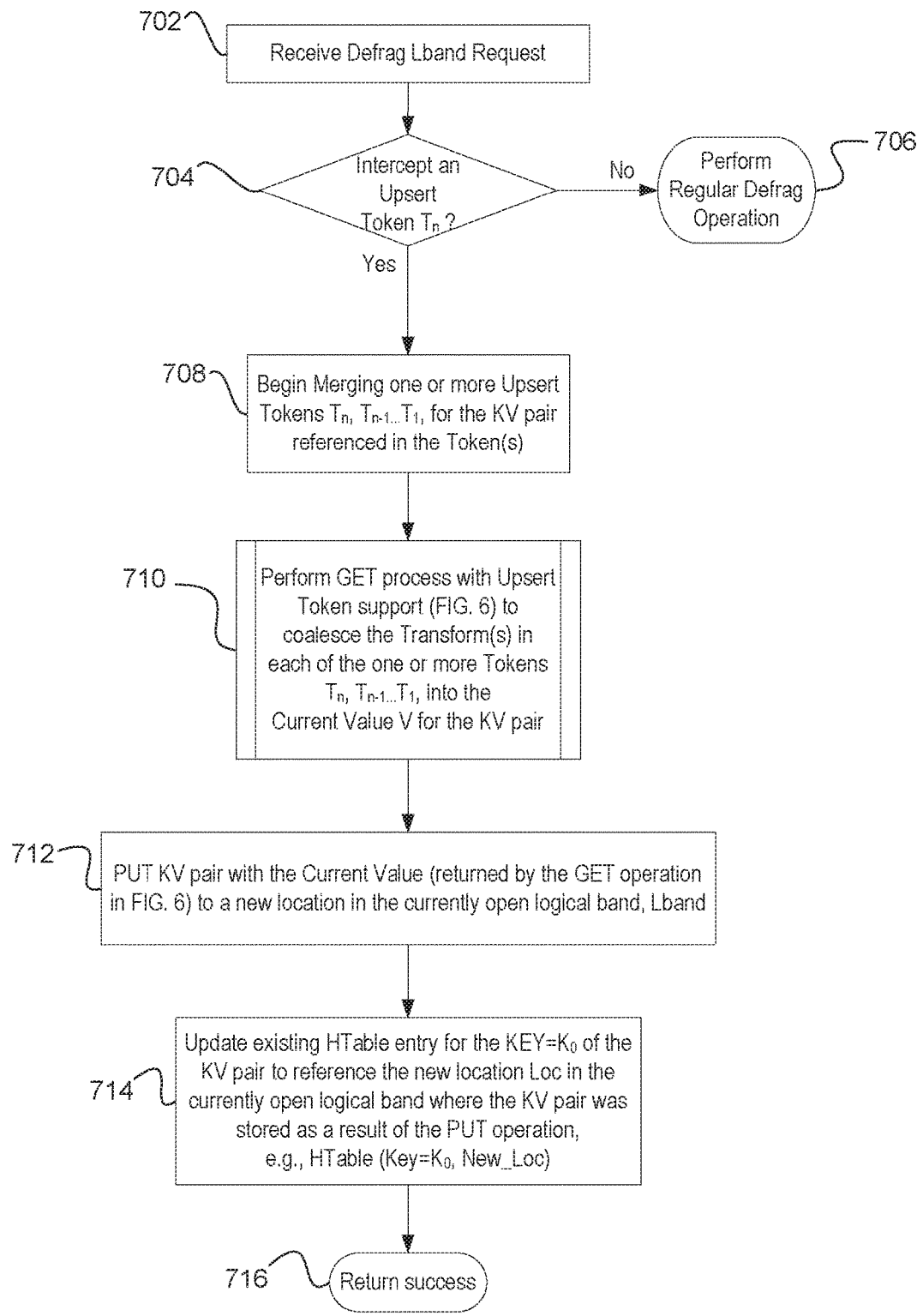
FIG. 7 illustrates an example third logic flow.

FIG. 7 illustrates an example logic flow 700 for a defragmentation process for Lbands that contain upsert tokens. For this example, a regular LB and defragmentation operation is modified to support Lbands containing upsert tokens. According to some examples, logic and/or features of controller 124 at memory or storage device 120 may implement the defragmentation operations, as modified to support upsert tokens, as part of periodic background operations that may be based on on-demand requests, completed at fixed time intervals or responsive to memory device capacity issues (e.g., all bands deemed as lacking capacity to store additional entry records and journals). Defragmentation operations may cause logic and/or features of controller 124 to read several hashes maintained in the flexible band journal 124. A hash "h" to where the number of hashes may be read may be included in H2P table 210 stored at NVM device(s) 121 (e.g., h(K#hashes)). Defragmentation operations may then cause logic and/or features of controller 124 to determine a size of flexible band journal 124 and then read hash values or hashes h for respective Keys from the flexible band journal to determine which h's for respective Keys read from flexible band journal 124 still have a P included in H2P cells 212 of H2P table 210 and thus entry records pointed to by these P's are deemed as still having valid data.

In some examples, for those h's for respective Keys read from flexible band journal 124 that were found to still have a P included in H2P cells 212 of H2P table 210, defragmentation operations may then cause logic and/or features of controller 124 to read (Key, Transform, Loc) fields for each respective upsert token entry record found to still have valid data. For these examples, the read (Key, Transform, Loc) fields of the upsert tokens may be relocated to a different band. NAND band 220 may then be erased to complete the defragmentation operation of NAND band 220. This type of entry record granularity to determine valid entry records for defragmentation may be more efficient than page-based validity determinations common in some other defragmentation operations.

At block 702 the defragmentation operation commences with the receipt of a defragment request for an Lband in which upsert tokens may be stored as entry records. At decision block 704, logic and/or features of controller 124 may determine whether an upsert token record is stored in the Lband being defragmented, then the upsert token support process 700 for defragmentation continues at block 708; otherwise a regular get operation is performed at block 706.

At block 708, logic and/or features of controller 124 begins to merge all upsert tokens T1 . . . n for the KV pair referenced in an upsert token T1 present in the Lband. The merge is accomplished at block 710 by performing the get process for the Key referenced in the token, where the get process is performed with upsert token support, as described in FIG. 6. The upsert token support coalesces the Transform contained in the upsert tokens to the current Value for the KV pair to which the merged upsert tokens pertain.

At block 712, once the current Value for the KV pair has been returned (by the successful completion of the get command with upsert token support as described in detail in FIG. 6), then logic and/or features of controller 124 issues a put command to update the KV pair with the current Value, and to store the KV pair in a new location in the currently open logical band, Lband.

At block 714, logic and/or features of controller 124 update the corresponding hash table entry for the Key to reference the new location in the currently open logical band LBand where the KV pair was stored and, at block 716, may return a success indication to indicate that the defragmentation operation for LB ands containing an upsert token has been successfully implemented.

Figure 8:
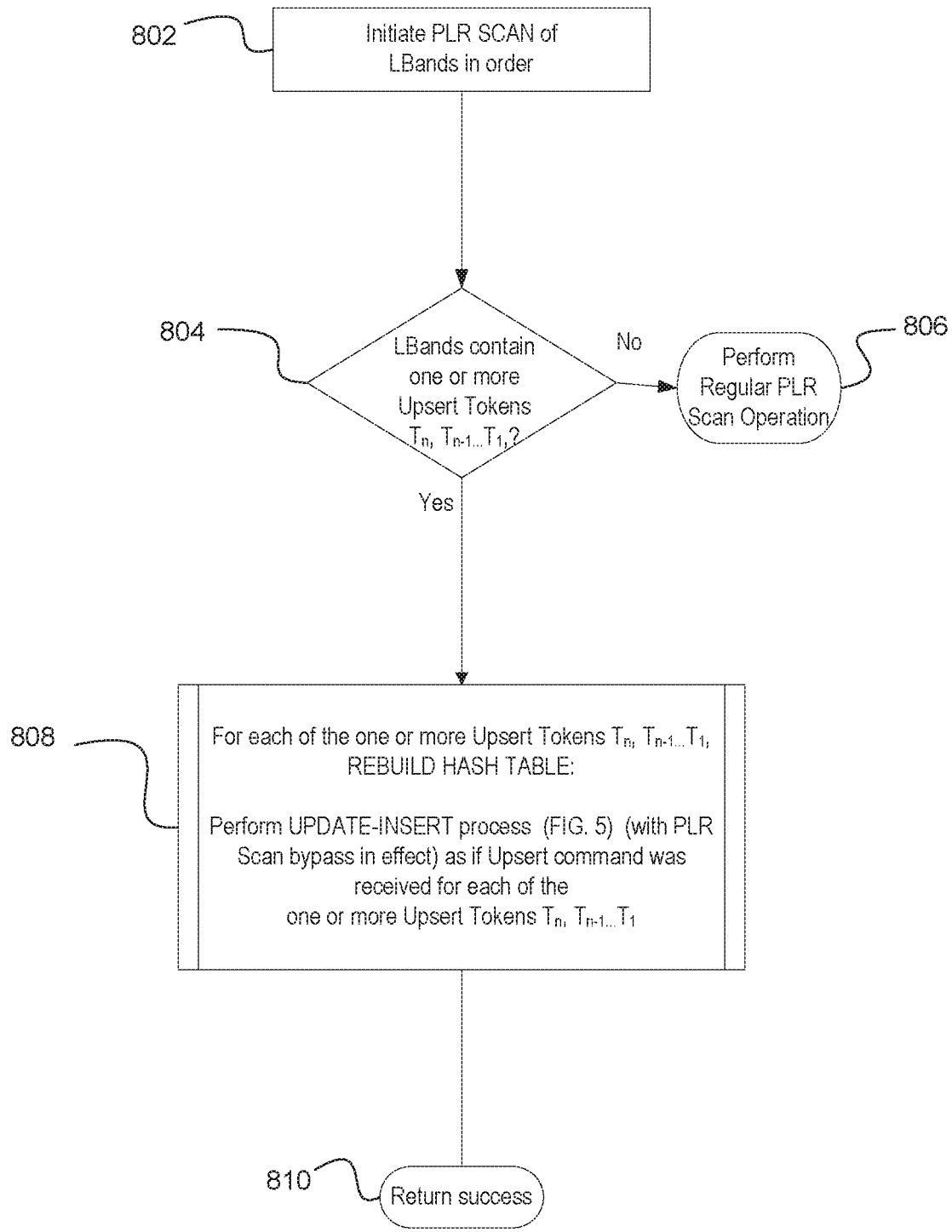
FIG. 8 illustrates an example fourth logic flow.

FIG. 8 illustrates an example logic flow 800 for a power-loss-recovery (PLR) process for Lbands that contain upsert tokens. For this example, regular PLR operation is modified to support Lbands containing upsert tokens. According to some examples, logic and/or features of controller 124 at memory or storage device 120 may implement the PLR operation, as modified to support upsert tokens, responsive to memory device failure due to power loss or other operational failure. The PLR operation is initiated when logic and/or features of controller 124 receive a scan key-value command associated with one or more Keys to cause the controller 124 to scan LB ands in order and return data from the entry records contained in the LB ands to the scan requestor. A sorted linked-list may be maintained with H2P table 210 at NVM device(s) 221 to facilitate implementing this type of key-value scan command.

At decision block 804 logic and/or features of controller 124 determine whether the entry record being scanned for the PLR operation contains upsert token(s) T1 . . . n. If not, then the controller 124 continues with the regular PLR operations. For LB ands that do contain upsert tokens, logic and/or features of controller 124 continues at block 808 to rebuild the hash table for the upsert tokens. The hash table is rebuilt by performing the update insert process described in detail in FIG. 5 except that the write/store process described at block 516 can be bypassed since the upsert token has already been stored in the LB and being scanned. In other words, for upsert tokens, only the hash table entries need to be regenerated during PLR operation.

Figure 9:
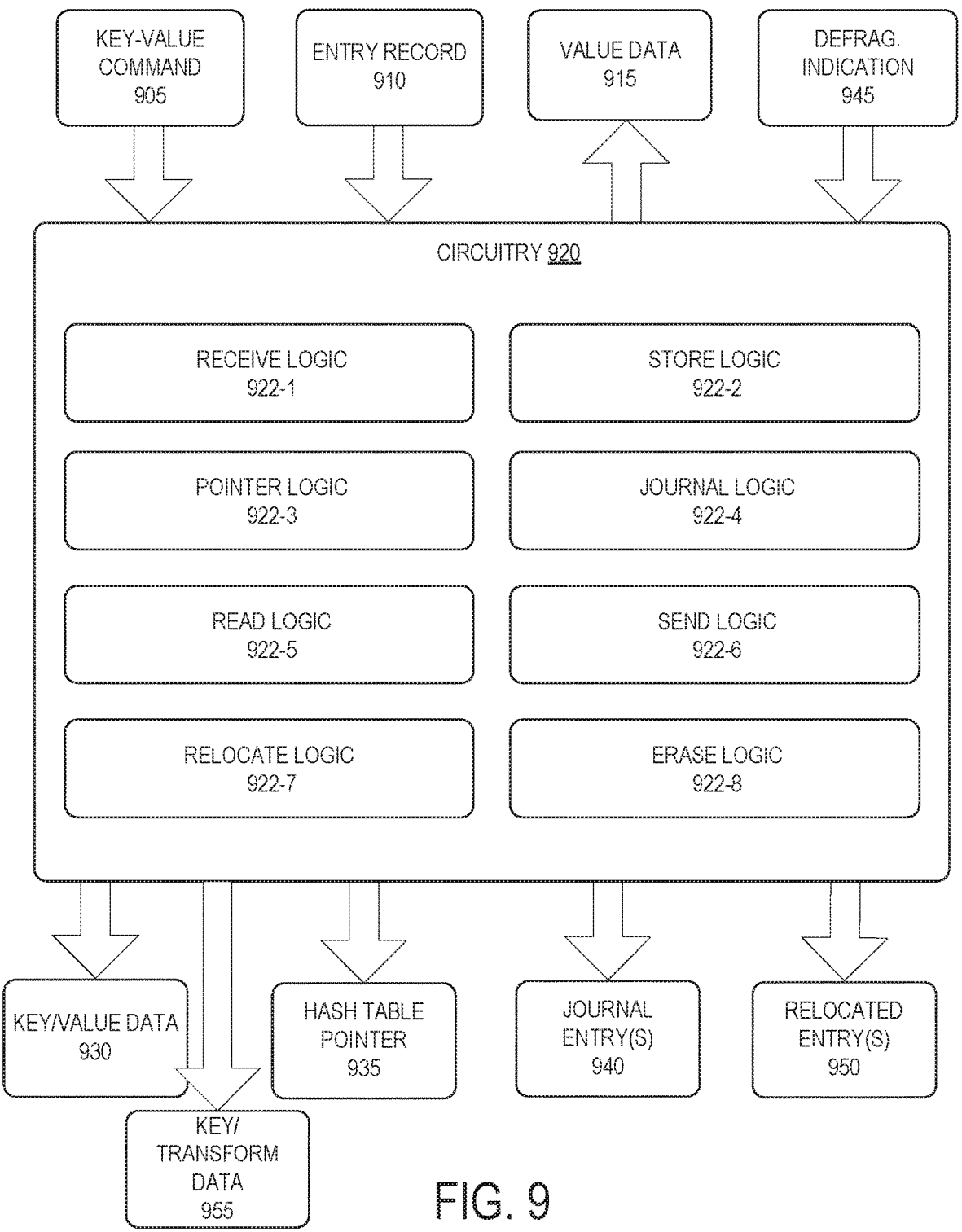
FIG. 9 illustrates an example apparatus.

FIG. 9 illustrates an example block diagram for an apparatus 900. Although apparatus 900 shown in FIG. 9 has a limited number of elements in a certain topology, it may be appreciated that the apparatus 900 may include greater or fewer elements in alternate topologies as desired for a given implementation.

The apparatus 900 may be supported by circuitry 920 and may be maintained or located at a controller for a memory or storage device such as controller 124 for memory or storage device 120 of system 100 shown in FIG. 1 and described above. Circuitry 920 may be arranged to execute one or more software or firmware implemented components or logic 922-a. It is worthy to note that "a" and "b" and "c" and similar designators as used herein are intended to be variables representing any positive integer. Thus, for example, if an implementation sets a value for a=8, then a complete set of software or firmware for components or logic 922-a may include components or logic 922-1, 922-2, 922-3, 922-4, 922-5, 922-6, 922-7 or 922-8. The examples presented are not limited in this context and the different variables used throughout may represent the same or different integer values. Also, these "components" or "logic" may be software/firmware stored in computer-readable media, and although the logic shown in FIG. 9 is depicted as discrete boxes, this does not limit this logic to storage in distinct computer-readable media components (e.g., a separate memory, etc.).

According to some examples, circuitry 920 may include a processor or processor circuitry. Circuitry 920 may be generally arranged to execute logic 922-a. The processor or processor circuitry can be any of various commercially available processors, including without limitation an AMD® Athlon®, Duron® and Opteron® processors; NVIDIA® Tegra® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 920 may also be an application specific integrated circuit (ASIC) and at least some components or logic 922-a may be implemented as hardware elements of the ASIC. In some examples, circuitry 920 may also include a field programmable gate array (FPGA) and at least some logic 922-a may be implemented as hardware elements of the FPGA.

According to some examples, apparatus 900 may include a receive logic 922-1. Receive logic 922-1 may be executed by circuitry 920 to receive a key-value put command that includes data for a key and data for a value, the data for the key and the data for the value to be stored to one or more first NVM devices maintained at the memory or storage device. For these examples, the key-value put command may be included in key-value command 905. In other examples, subsequent commands may be received by receive logic 922-1 that may include at least the data for the key. For example, key-value get, delete or scan commands may include the data for the key. In another example, for an apparatus 900 that supports update-insert operations, key-value upsert commands may include at least the data for the key and data for a transform to a previous value of a key-value entry record.

In some examples, apparatus 900 may also include a store logic 922-2. Store logic 922-2 may be executed by circuitry 920 to cause the data for the key and the data for the value to be stored in the one or more first NVM devices as an entry record 910 located at an address range. For these examples, the data for the key and the data for the value may be included in key-value data 930. In other examples, for an apparatus 900 that supports update-insert operations, store logic 922-2 may be executed by circuitry 920 to cause the data for the key to be stored in the one or more first NVM devices as an upsert token entry record 910 at a location in an address range, where the store logic 922-2 assembles the upsert token from the data for the key as well as data for a transform for updating a previous value stored in key-value data 930. For these examples, the data for the key and the data for the transform may be included in key-transform data 950.

According to some examples, apparatus 900 may also include a pointer logic 922-3. Pointer logic 922-3 may be executed by circuitry 920 to add a pointer to a hash table to map a hash value to the entry record at the address range, the hash value generated via use of the data for the key, the hash table stored in one or more second NVM devices maintained at the memory or storage device. For these examples, the pointer may be included in hash table pointer 935. In some examples, the pointer may be added to a link that may be used to select the pointer based on the hash value. In other examples, for an apparatus 900 that supports update-insert operations, the pointer may be assembled into an upsert token and included in key-transform data 955 by store logic 922-2 for subsequent use in coalescing any one or more transforms from the upsert tokens into a previous value stored in key-value data 930 as described in further detail below with reference to read logic 922-5.

In some examples, apparatus 900 may also include a journal logic 922-4. Journal logic 922-4 may be executed by circuitry 920 to cause the hash value to be maintained in a journal stored in the one or more first NVM devices. For these examples, the hash value may be included in journal entry(s) 940.

According to some examples, apparatus 900 may also include a read logic 922-5. Read logic 922-5 may be executed by circuitry 920 to read the entry record stored in the one or more first NVM devices based on the pointer to obtain the data for the value. For these examples, the entry record read may be included in entry record 910. Read logic 922-5 may read the entry record responsive to a key-value get command or a key-value scan command received by receive logic and using a pointer selected by pointer logic 922-3. For an apparatus 900 that supports update-insert operations, read logic 922-5 may be executed by circuitry 920 to read an upsert token stored as an entry record in the one or more first NVM devices based on the selected pointer. Then, read logic 922-5 may be executed by circuitry 920 to further read the previously stored key-value entry record based on the pointer assembled into the upsert token, and to coalesce the data for one or more transforms stored in one or more upsert tokens into the data for the value (in the previously stored key-value entry record). In this manner, the read logic 922-5 obtains the current value for the key-value pair that has been updated using update-insert operations.

In some examples, apparatus 900 may also include a send logic 922-6. Send logic 922-6 may be executed by circuitry 920 to send the data for the value to a source of the key-value get command or the key-value scan command that caused read logic 922-5 to read the entry record. For these examples, value data 915 may include the data for the value sent to the source. For an apparatus 900 that supports update-insert operations, value data 915 may include the data for any upsert token transform(s) coalesced into the current data for the value sent to the source.

According to some examples, the entry record and the journal stored in the one or more first NVM devices may be stored in a first band included in the one or more first NVM devices. For example, receive logic 922-1 may receive an indication to implement a defragmentation operation on the first band. The indication (e.g., time interval expired, on-demand request or capacity full indication) may be included in defragmentation indication 945. Read logic 922-5 may then read data from the journal to determine which hashes maintained in the journal correspond to pointers included in the hash table stored in the one or more second NVM devices. For an apparatus 900 that supports update-insert operations, read logic 922-5 may include support for defragmentation operations on bands containing upsert tokens, including coalescing the transforms contained in the upsert tokens into a current value for the key-value pair and stored as a single KV pair entry record. Journal logic 922-4 may then determine that hashes having corresponding pointers include valid data in respective entry records for the corresponding pointers. Read logic 922-5 may then read the respective entry records.

A relocate logic 922-7 also included in apparatus 900 may be executed by circuitry 920 to relocate the valid data in the respective entry records to a second band included in the one or more first NVM devices. The relocated entry records may be included in relocated entry(s) 950. An erase logic 922-8 also included in apparatus 900 may be executed by circuitry 920 to erase the data stored in the first band.

For an apparatus 900 that supports update-insert operations, a power-loss-recovery operation includes support for re-building a hash table to map the hash values to existing upsert tokens stored as entry records at locations in an address range, including an address range or a logical address range. For example, receive logic 922-1 may receive an indication to implement a power-loss-recovery operation for a hash table having entries that map to entry records containing upsert tokens. For this example, the receive logic 922-1 initiates an update-insert operation as if an upsert command was received for each key represented in the entry records until the hash table is rebuilt, but without assembling or storing any upsert tokens.

In some examples, rather than copy the data structure to the persistent memory, a persistent memory file may be maintained based on allocated persistent memory being utilized by applications to create data structures in a mapped persistent memory file. For an allocated portion of the persistent memory that is mapped all reference offsets for these data structures may hold values that are offsets from a based pointer of the mapped persistent memory file. This may result in a single instance of these data structures existing in respective mapped persistent memory files and hence to need to copy.

Figure 10:
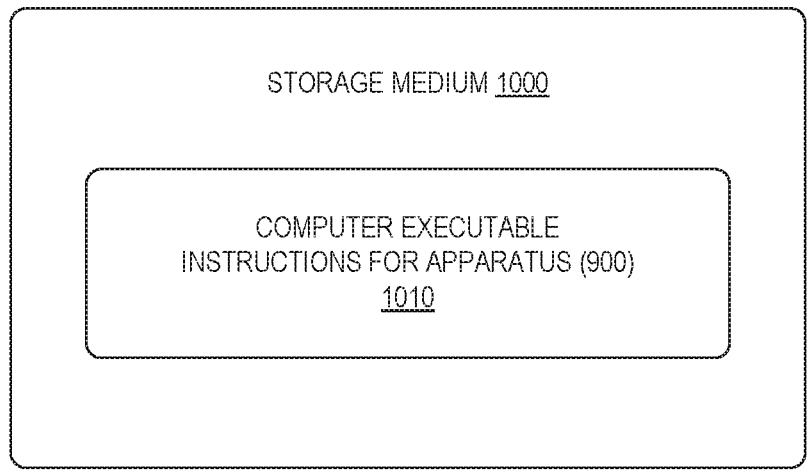
FIG. 10 illustrates an example storage medium.

FIG. 10 illustrates an example storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions 1010, such as instructions to implement logic flows described in FIGS. 5-8 for apparatus 900. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
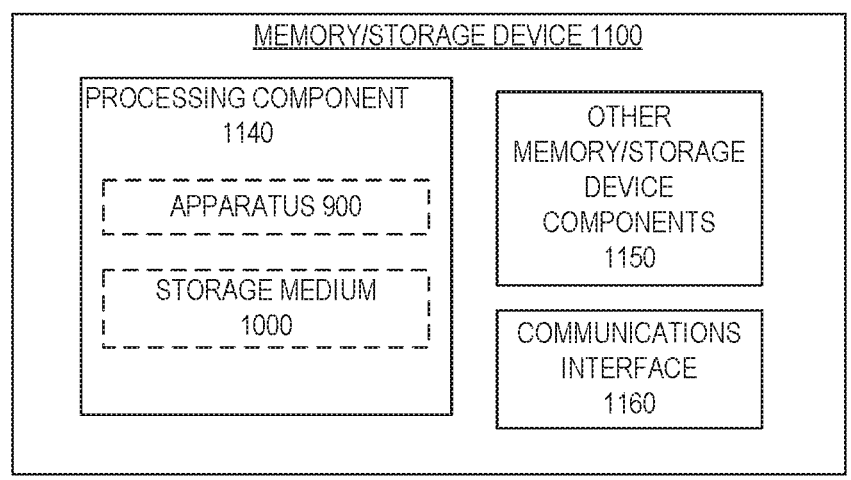
FIG. 11 illustrates an example memory or storage device.

FIG. 11 illustrates an example memory/storage device 1100. In some examples, as shown in FIG. 11, memory/storage device 1100 may include a processing component 1140, other storage device components 1150 or a communications interface 1160. According to some examples, memory/storage device 1100 may be capable of being coupled to a host CPU of a host computing device or platform, such as host CPU 110 shown in FIG. 1. Also, memory/storage device 1100 may be similar to memory or storage device 120 shown in FIG. 1.

According to some examples, processing component 1140 may execute processing operations or logic for apparatus 900 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, programmable logic devices (PLD), digital signal processors (DSP), FPGA/ programmable logic, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other storage device components 1150 may include common computing elements or circuitry, such as one or more processors, multi-core processors, co-processors, memory units, chipsets, controllers, interfaces, oscillators, timing devices, power supplies, and so forth. Examples of memory units may include without limitation various types of computer readable and/or machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristers, STT-MRAM, magnetic or optical cards, and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols such as SMBus, PCIe, NVMe, QPI, SATA, SAS, NVMf, S3, Swift, Kinetic or USB communication protocols. Network communications may occur via use of communication protocols such as Ethernet, Infiniband, SATA or SAS communication protocols.

Memory/storage device 1100 may be arranged as an SSD or an HDD that may be configured as described above for memory or storage device 120 of system 100 as shown in FIG. 1. Accordingly, functions and/or specific configurations of memory/storage device 1100 described herein, may be included or omitted in various embodiments of memory/ storage device 1100, as suitably desired.

The components and features of memory/storage device 1100 may be implemented using any combination of discrete circuitry, ASICs, logic gates and/or single chip architectures. Further, the features of memory/storage device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example memory/storage device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Additional examples of technologies disclosed herein as disclosed as follows:

Example 1

An example apparatus comprising circuitry at a controller for a memory or storage device, the circuitry coupled to one or more non-volatile memory ("NVM") devices is to execute logic for receiving, for a key-value ("KV") pair stored at a first location in one or more first NVM devices, a command for updating the KV pair, the command including data for a key of the KV pair and data for a transform for updating a value of the KV pair, and responsive to receiving the command, mapping the key to the first location where the KV pair is stored, including generating a hash value from the data for the key, the hash value corresponding to a hash table entry containing a pointer to the first location, assembling an update-insert ("upsert") token from the data for the key, the data for the transform, and a pointer to the first location, storing the upsert token at a second location in the one or more first NVM devices, and mapping the key to the second location, including updating the pointer contained in the corresponding hash table entry to point to the second location.

Example 2

In the apparatus of Example 1, the circuitry is further to execute logic for receiving a second command for reading the KV pair that includes at least the data for the key, and, responsive to receiving the second command, mapping the key to a most recent location associated with the KV pair, the most recent location including any one of the first location where the KV pair is stored and any one of one or more second locations where upsert tokens are stored, reading the upsert token at the most recent location associated with the KV pair until the all the one or more upsert tokens for updating the value of the KV pair have been read, coalescing the transform(s) of all the one or more upsert token(s) into the value of the KV pair to obtain a current value of the KV pair, and returning the current value of the KV pair to a source of the second command.

Example 3

In the apparatus of Example 1, any of the locations in the one or more first NVM devices is an address range where an entry record is stored, the entry record containing any one of the KV pair and the one or more upsert tokens for updating the value of the KV pair.

Example 4

In the apparatus of Example 3, the circuitry is further to execute logic for receiving a request to defragment the address range at which any one or more upsert tokens are stored, intercepting an upsert token during defragmenting, the upsert token stored in the address range being defragmented, issuing the second command for reading the KV pair that includes at least the data for the key contained in the upsert token, the second command returning the current value of the KV pair, storing the KV pair with the current value at a third location, and mapping the key to the third location.

Example 5

In the apparatus of Example 3, the circuitry is further to execute logic for scanning, in order, the address range at which any one or more upsert tokens are stored during a power-loss-recovery operation, and rebuilding the hash table entries for the any one or more upsert tokens intercepted during scanning.

Example 6

In the apparatus of Example 5, rebuilding the hash table entries for the any one or more upsert tokens encountered during scanning includes initiating the command for updating the KV pair for each upsert token as if the command was just received, mapping the key to the first location in the address range where the KV pair is stored as referenced in the first upsert token for the KV pair, mapping the key to the second location in the address range where the first upsert token for the KV pair is stored, and as each subsequent upsert token is encountered, mapping the key to each location in the address range where each subsequent upsert token is stored.

Example 7

In the apparatus of Example 1, the circuitry is further to execute logic for adding the pointer to any one of the locations to a linked list used to select pointers based on the hash value.

Example 8

In the apparatus of Example 1, the hash table is stored in one or more second NVM devices, the second NVM devices in a logical band separate from the first NVM devices.

Example 9

In the apparatus of Example 1, the apparatus comprises the one or more first NVM devices including NAND flash memory and the one or more second NVM devices including 3-dimensional cross-point memory that uses chalcogenide phase change material.

Example 10

In the apparatus of Example 1, the apparatus comprises the one or more first NVM devices or the one or more second NVM devices including 3-dimensional cross-point memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque-magnetoresistive random access memory (STT-MRAM).

Example 11

In the apparatus of Example 1, the command for updating the value of the KV pair is a KV update-insert ("upsert") command.

Example 12

In the apparatus of Example 3, the address range where an entry record is stored includes any one of a physical address and a logical address.

Example 13

A example method comprises receiving, at a controller for a memory or storage device, the controller coupled to one or more non-volatile memory ("NVM") devices, a command for updating a key-value ("KV") pair stored at a first location in one or more first NVM devices, the command including data for a key of the KV pair and data for a transform for updating a value of the KV pair; and, responsive to receiving the command, mapping the key to the first location where the KV pair is stored, including generating a hash value from the data for the key, the hash value corresponding to a hash table entry containing a pointer to the first location, assembling an update-insert ("upsert") token from the data for the key, the data for the transform, and a pointer to the first location, storing the upsert token at a second location in the one or more first NVM devices, and mapping the key to the second location, including updating the pointer contained in the corresponding hash table entry to point to the second location.

Example 14

In the method of Example 13, the method further comprises receiving a second command for accessing the KV pair, the second command including at least the data for the key, and, responsive to receiving the second command, mapping the key to a most recent location associated with the KV pair, the most recent location including any one of the first location where the KV pair is stored and any one of one or more second locations where upsert tokens are stored, reading the upsert token at the most recent location associated with the KV pair until the all the one or more upsert tokens for updating the value of the KV pair have been read, coalescing the transform(s) of all the one or more upsert token(s) into the value of the KV pair to obtain a current value of the KV pair, and returning the current value of the KV pair to a source of the second command.

Example 15

In the method of Example 13, any of the locations in the one or more first NVM devices is an address range where an entry record is stored, the entry record containing any one of the KV pair and the one or more upsert tokens for updating the value of the KV pair.

Example 16

In the method of Example 13, the method further comprises receiving a request to defragment the address range at which any one or more upsert tokens are stored, intercepting an upsert token during defragmenting, the upsert token stored in the address range being defragmented, issuing the second command for reading the KV pair that includes at least the data for the key contained in the upsert token, the second command returning the current value of the KV pair, storing the KV pair with the current value at a third location; and mapping the key to the third location.

Example 17

In the method of Example 13, the method further comprises scanning, in order, the address range at which any one or more upsert tokens are stored during a power-loss-recovery operation, and rebuilding the hash table entries for the any one or more upsert tokens intercepted during scanning.

Example 18

In the method of Example 17, rebuilding the hash table entries for the any one or more upsert tokens encountered during scanning includes initiating the command for updating the KV pair for each upsert token as if the command was just received, mapping the key to the first location in the address range where the KV pair is stored as referenced in the first upsert token for the KV pair, mapping the key to the second location in the address range where the first upsert token for the KV pair is stored, and as each subsequent upsert token is encountered, mapping the key to each location in the address range where each subsequent upsert token is stored.

Example 19

In the method of Example 13, the method further comprises adding the pointer to any one of the locations to a linked list used to select pointers based on the hash value.

Example 20

In the method of Example 13, the hash table is stored in one or more second NVM devices, the second NVM devices in a logical band separate from the first NVM devices.

Example 21

In the method of Example 13, any of the one or more first NVM devices includes NAND flash memory and any of the one or more second NVM devices includes 3-dimensional cross-point memory that uses chalcogenide phase change material.

Example 22

In the method of Example 13, any of the one or more first NVM devices and any of the one or more second NVM devices includes 3-dimensional cross-point memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque-magnetoresistive random access memory (STT-MRAM).

Example 23

In the method of Example 13, the command for updating the value of the KV pair is a KV update-insert ("upsert") command.

Example 24

In the method of Example 15, the address range where an entry record is stored includes any one of a physical address and a logical address.

Example 25

At least one example of a machine readable medium comprising a plurality of instructions executable by a system to cause the system to receive, at a controller for a memory or storage device, the controller coupled to one or more non-volatile memory ("NVM") devices, a command for updating a key-value ("KV") pair stored at a first location in one or more first NVM devices, the command including data for a key of the KV pair and data for a transform for updating a value of the KV pair; and, responsive to receiving the command, map the key to the first location where the KV pair is stored, including generating a hash value from the data for the key, the hash value corresponding to a hash table entry containing a pointer to the first location, wherein the hash table is stored in one or more second NVM devices, the second NVM devices in a logical band separate from the first NVM devices, assemble an update-insert ("upsert") token from the data for the key, the data for the transform, and a pointer to the first location, store the upsert token at a second location in the one or more first NVM devices, and map the key to the second location, including updating the pointer contained in the corresponding hash table entry to point to the second location.

Example 26

In the at least one computer-readable medium of Example 25, the plurality of instructions further cause the system to receive a second command for accessing the KV pair, the second command including at least the data for the key, and, responsive to receiving the second command, the plurality of instructions further causing the system to map the key to a most recent location associated with the KV pair, the most recent location including any one of the first location where the KV pair is stored and any one of one or more second locations where upsert tokens are stored, read the upsert token at the most recent location associated with the KV pair until the all the one or more upsert tokens for updating the value of the KV pair have been read, coalesce the transform (s) of all the one or more upsert token(s) into the value of the KV pair to obtain a current value of the KV pair, and return the current value of the KV pair to a source of the second command.

Example 27

In the at least one computer-readable medium of Example 25, any of the locations in the one or more first NVM devices is an address range where an entry record is stored, wherein the address range includes any one of a physical address and a logical address, the entry record containing any one of the KV pair and the one or more upsert tokens for updating the value of the KV pair.

Example 28

In the at least one computer-readable medium of Example 27, the plurality of instructions further cause the system to receive a request to defragment the address range at which any one or more upsert tokens are stored, intercept an upsert token during defragmenting, the upsert token stored in the address range being defragmented, issue the second command for reading the KV pair that includes at least the data for the key contained in the upsert token, the second command returning the current value of the KV pair, store the KV pair with the current value at a third location, and map the key to the third location.

Example 29

In the at least one computer-readable medium of Example 27, the plurality of instructions further causing the system to scan, in order, the address range at which any one or more upsert tokens are stored during a power-loss-recovery operation, and rebuild the hash table entries for the any one or more upsert tokens intercepted during scanning, the plurality of instructions to rebuild further causing the system to initiate the command for updating the KV pair for each upsert token as if the command was just received, map the key to the first location in the address range where the KV pair is stored as referenced in the first upsert token for the KV pair, map the key to the second location in the address range where the first upsert token for the KV pair is stored, and as each subsequent upsert token is encountered, map the key to each location in the address range where each subsequent upsert token is stored.

Example 30

In the at least one computer-readable medium of Example 25, the plurality of instructions further cause the system to add the pointer to any one of the locations to a linked list used to select pointers based on the hash value.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry, including any of a processor and processor circuitry, at a controller for a memory or storage device, the circuitry communicatively coupled to one or more non-volatile memory ("NVM") devices and to execute logic to:
   receive, for a key-value ("KV") pair stored at a first location in one or more first NVM devices, a command to update the KV pair, the command including data for a key of the KV pair and data for a transform to update a value of the KV pair; and
   responsive to receipt of the command:
      map the key to the first location where the KV pair is stored, including to generate a hash value from the data for the key, the hash value corresponding to a hash table entry containing a pointer to the first location,
      assemble an update-insert ("upsert") token from the data for the key, the data for the transform, and the pointer to the first location,
      store the upsert token at a second location in the one or more first NVM devices, and
      map the key to the second location, including updating the pointer contained in a corresponding hash table entry to point to the second location.

2. The apparatus of claim 1, the circuitry to execute logic to:
   receive a second command for reading the KV pair that includes at least the data for the key; and
   responsive to receipt of the second command:
      map the key to a most recent location associated with the KV pair, the most recent location including any one of the first location where the KV pair is stored and any one of one or more second locations where upsert tokens are stored,
      read the upsert token at the most recent location associated with the KV pair until all of one or more upsert tokens to update the value of the KV pair have been read,
      coalesce the transform(s) of all the one or more upsert token(s) into the value of the KV pair to obtain a current value of the KV pair, and
      return the current value of the KV pair to a source of the second command.

3. The apparatus of claim 1, wherein any of the locations in the one or more first NVM devices is an address range where an entry record is stored, the entry record containing any one of the KV pair and the one or more upsert tokens to update the value of the KV pair.

4. The apparatus of claim 3, the circuitry further to execute logic to:
   receive a request to defragment the address range at which any one or more upsert tokens are stored;
   intercept an upsert token during defragmenting, the upsert token stored in the address range being defragmented;
   issue the second command for reading the KV pair that includes at least the data for the key contained in the upsert token, the second command to return a current value of the KV pair;
   store the KV pair with the current value at a third location; and
   map the key to the third location.

5. The apparatus of claim 3, the circuitry further to execute logic for:
   scan, in order, the address range at which any one or more upsert tokens are stored during a power-loss-recovery operation; and
   rebuild the hash table entries for the any one or more upsert tokens intercepted during a scan.

6. The apparatus of claim 5, wherein to rebuild the hash table entries for the any one or more upsert tokens encountered during to scan includes:
   initiate the command to update the KV pair for each upsert token as if the command was just received;
   map the key to the first location in the address range where the KV pair is stored as referenced in a first upsert token for the KV pair;
   map the key to the second location in the address range where the first upsert token for the KV pair is stored; and
   as each subsequent upsert token is encountered, map the key to each location in the address range where each subsequent upsert token is stored.

7. The apparatus of claim 1, the circuitry further to execute logic to add the pointer to any one of the locations to a linked list used to select pointers based on the hash value.

8. The apparatus of claim 1, wherein the hash table is stored in one or more second NVM devices, the second NVM devices in a logical band separate from the first NVM devices.

9. The apparatus of claim 8, comprising the one or more first NVM devices including NAND flash memory and the one or more second NVM devices including 3-dimensional cross-point memory that uses chalcogenide phase change material.

10. The apparatus of claim 8 wherein the one or more first NVM devices or the one or more second NVM devices comprises 3-dimensional cross-point memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque magnetoresistive random access memory (STT-MRAM).

11. The apparatus of claim 1, wherein the command for updating the value of the KV pair is a KV update-insert ("upsert") command.

12. The apparatus of claim 3, wherein the address range where an entry record is stored includes any one of a physical address and a logical address.

13. A method comprising:
receiving, at a controller for a memory or storage device, the controller coupled to one or more non-volatile memory ("NVM") devices, a command for updating a key-value ("KV") pair stored at a first location in one or more first NVM devices, the command including data for a key of the KV pair and data for a transform for updating a value of the KV pair; and, responsive to receiving the command:
mapping the key to the first location where the KV pair is stored, including generating a hash value from the data for the key, the hash value corresponding to a hash table entry containing a pointer to the first location;
assembling an update-insert ("upsert") token from the data for the key, the data for the transform, and the pointer to the first location;
storing the upsert token at a second location in the one or more first NVM devices; and
mapping the key to the second location, including updating the pointer contained in a corresponding hash table entry to point to the second location.

14. The method of claim 13 further comprising:
receiving a second command for accessing the KV pair, the second command including at least the data for the key; and, responsive to receiving the second command:
mapping the key to a most recent location associated with the KV pair, the most recent location including any one of the first location where the KV pair is stored and any one of one or more second locations where upsert tokens are stored;
reading the upsert token at the most recent location associated with the KV pair until all of the one or more upsert tokens for updating the value of the KV pair have been read;
coalescing the transform(s) of all the one or more upsert token(s) into the value of the KV pair to obtain a current value of the KV pair, and
returning the current value of the KV pair to a source of the second command.

15. The method of claim 13, wherein any of the locations in the one or more first NVM devices is an address range where an entry record is stored, the entry record containing any one of the KV pair and the one or more upsert tokens for updating the value of the KV pair.

16. The method of claim 15 further comprising:
receiving a request to defragment the address range at which any one or more upsert tokens are stored;
intercepting an upsert token during defragmenting, the upsert token stored in the address range being defragmented;
issuing the second command for reading the KV pair that includes at least the data for the key contained in the upsert token, the second command returning a current value of the KV pair;
storing the KV pair with the current value at a third location; and
mapping the key to the third location.

17. The method of claim 15 further comprising:
scanning, in order, the address range at which any one or more upsert tokens are stored during a power-loss-recovery operation; and
rebuilding the hash table entries for the any one or more upsert tokens intercepted during scanning.

18. The method of claim 17, wherein rebuilding the hash table entries for the any one or more upsert tokens encountered during scanning includes:
initiating the command for updating the KV pair for each upsert token as if the command was just received;
mapping the key to the first location in the address range where the KV pair is stored as referenced in a first upsert token for the KV pair;
mapping the key to the second location in the address range where the first upsert token for the KV pair is stored; and
as each subsequent upsert token is encountered, mapping the key to each location in the address range where each subsequent upsert token is stored.

19. The method of claim 13 further comprising:
adding the pointer to any one of the locations to a linked list used to select pointers based on the hash value.

20. The method of claim 13, wherein the hash table is stored in one or more second NVM devices, the second NVM devices in a logical band separate from the first NVM devices.

21. The method of claim 20 wherein any of the one or more first NVM devices includes NAND flash memory and any of the one or more second NVM devices includes 3-dimensional cross-point memory that uses chalcogenide phase change material.

22. The method claim 20 wherein any of the one or more first NVM devices and any of the one or more second NVM devices comprise 3-dimensional cross-point memory that uses chalcogenide phase change material, flash memory, ferroelectric memory, silicon-oxide-nitride-oxide-silicon (SONOS) memory, polymer memory, ferroelectric polymer memory, ferroelectric transistor random access memory (FeTRAM or FeRAM), ovonic memory, nanowire, electrically erasable programmable read-only memory (EEPROM), phase change memory, memristors or spin transfer torque magnetoresistive random access memory (STT-MRAM).

23. The method of claim 13, wherein the command for updating the value of the KV pair is a KV update-insert ("upsert") command.

24. The method of claim 15, wherein the address range where an entry record is stored includes any one of a physical address and a logical address.

25. At least one computer-readable medium comprising a plurality of instructions executable by a system to cause the system to:
receive, at a controller for a memory or storage device, the controller coupled to one or more non-volatile memory ("NVM") devices, a command for updating a key-value ("KV") pair stored at a first location in one or more first NVM devices, the command including data for a key of the KV pair and data for a transform for updating a value of the KV pair; and, responsive to receiving the command:
map the key to the first location where the KV pair is stored, including generating a hash value from the data for the key, the hash value corresponding to a hash table entry containing a pointer to the first location, wherein the hash table is stored in one or more second NVM devices, the second NVM devices in a logical band separate from the first NVM devices;

assemble an update-insert ("upsert") token from the data for the key, the data for the transform, and the pointer to the first location;

store the upsert token at a second location in the one or more first NVM devices; and map the key to the second location, including updating the pointer contained in a corresponding hash table entry to point to the second location.

26. The at least one computer-readable medium of claim 25, the plurality of instructions further causing the system to:

receive a second command for accessing the KV pair, the second command including at least the data for the key; and, responsive to receiving the second command, the plurality of instructions further causing the system to:

map the key to a most recent location associated with the KV pair, the most recent location including any one of the first location where the KV pair is stored and any one of one or more second locations where upsert tokens are stored;

read the upsert token at the most recent location associated with the KV pair until all of the one or more upsert tokens for updating the value of the KV pair have been read;

coalesce the transform(s) of all the one or more upsert token(s) into the value of the KV pair to obtain a current value of the KV pair, and return the current value of the KV pair to a source of the second command.

27. The at least one computer-readable medium of claim 25, wherein any of the locations in the one or more first NVM devices is an address range where an entry record is stored, wherein the address range includes any one of a physical address and a logical address, the entry record containing any one of the KV pair and the one or more upsert tokens for updating the value of the KV pair.

28. The at least one computer-readable medium of claim 27, the plurality of instructions further causing the system to:

receive a request to defragment the address range at which any one or more upsert tokens are stored;

intercept an upsert token during defragmenting, the upsert token stored in the address range being defragmented;

issue the second command for reading the KV pair that includes at least the data for the key contained in the upsert token, the second command returning a current value of the KV pair;

store the KV pair with the current value at a third location; and map the key to the third location.

29. The at least one computer-readable medium of claim 27, the plurality of instructions further causing the system to:

scan, in order, the address range at which any one or more upsert tokens are stored during a power-loss-recovery operation; and rebuild the hash table entries for the any one or more upsert tokens intercepted during scanning, the plurality of instructions to rebuild further causing the system to:

initiate the command for updating the KV pair for each upsert token as if the command was just received, map the key to the first location in the address range where the KV pair is stored as referenced in a first upsert token for the KV pair, map the key to the second location in the address range where the first upsert token for the KV pair is stored, and as each subsequent upsert token is encountered, map the key to each location in the address range where each subsequent upsert token is stored.

30. The at least one computer-readable medium of claim 25, the plurality of instructions further causing the system to:

add the pointer to any one of the locations to a linked list used to select pointers based on the hash value.

* * * * *